(12) United States Patent
Janakiraman et al.

(10) Patent No.: US 7,437,606 B2
(45) Date of Patent: Oct. 14, 2008

(54) METHOD OF CHECKPOINTING PARALLEL PROCESSES IN EXECUTION WITHIN PLURALITY OF PROCESS DOMAINS

(75) Inventors: Gopalakrishnan Janakiraman, Sunnyvale, CA (US); Dinesh Kumar Subhraveti, Los Angeles, CA (US); Jose Renato Santos, San Jose, CA (US); Yoshio Frank Turner, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 780 days.

(21) Appl. No.: 10/924,513

(22) Filed: Aug. 23, 2004

(65) Prior Publication Data

US 2006/0041786 A1 Feb. 23, 2006

(51) Int. Cl.
*G06F 11/00* (2006.01)
(52) U.S. Cl. .......................... 714/15; 712/228
(58) Field of Classification Search ............... 714/15, 714/45; 712/228; 719/314
See application file for complete search history.

(56) References Cited

U.S. PATENT DOCUMENTS

| 6,338,147 | B1 | 1/2002 | Meth et al. |
| 6,393,583 | B1 * | 5/2002 | Meth et al. ............ 714/12 |
| 7,275,183 | B2 * | 9/2007 | Santos et al. ............ 714/35 |
| 2002/0087916 | A1 | 7/2002 | Meth |

OTHER PUBLICATIONS

Bouteiller, A., et al., Coordinated checkpoint versus message log for fault tolerant MPI, Dec. 2003.
Duell, J., The Design and Implementation of Berkeley Lab's Linux Checkpoint/Restart, 2003.
Litzkow, M., et al., Checkpoint and Migration of UNIX Processes in the Condor Distributed Processing System, 1997.
Osman, S., et al., The Design and Implementation of Zap: A System for Migrating Computing Environments, Proc. OSDI 2002, Dec. 2002.
Plank, J.S. et al. Libckpt: Transparent Checkpointing under Unix, < http://www.cs.utk.edu/plank/plank/papers/USENIX-95W.html> , 1995.
Plank, J.S., An Overview of Checkpointing in Uniprocessor and Distributed Systems, Focusing on Implementation and Performance, Tech. Report UT-CS-97-372, Univ. of Tenn. Knoxville, Tenn., Jul. 1997.
Stellner, G., CoCheck: Checkpointing and Process Migration for MPI, 1996.
Youhui, Z., etal., Checkpointing and Migration of parallel processes based on Message Passing Interface, Oct. 2002.
Zhong, H., et al., CRAK: Linux Checkpoint/Restart As a Kernel Module, Technical Report CUCS-014-01, < http://www.ncl.cs.columbia/research/migrate/crak.html> , Nov. 2001.
E. N. (Mootaz) Elnozahy et al., A Survey of Rollback-Recovery Protocols in Message-Passing Systems, Sep. 2002, ACM Computing Surveys, 34(3):375-408, and bibliography 1-10, ACM Press, New York, NY.

* cited by examiner

*Primary Examiner*—Yolanda L Wilson (57) ABSTRACT

An embodiment of a method of checkpointing parallel processes in execution within a plurality of process domains begins with a step of setting communication rules to stop communication between the process domains. Each process domain comprises an execution environment at a user level for at least one of the parallel processes. The method continues with a step of checkpointing each process domain and any in-transit messages. The method concludes with a step of resetting the communication rules to allow the communication between the process domains.

22 Claims, 7 Drawing Sheets

METHOD OF CHECKPOINTING PARALLEL PROCESSES IN EXECUTION WITHIN PLURALITY OF PROCESS DOMAINS

FIELD OF THE INVENTION

The present invention relates to the field of parallel processes. More particularly, the present invention relates to the field of parallel processes where a checkpointing technique records an intermediate state of parallel processes.

BACKGROUND OF THE INVENTION

A computer in operation includes hardware, software, and data. The hardware typically includes a processor, memory, storage, and I/O (input/output) devices coupled together by a bus. The software typically includes an operating system and applications. The applications perform useful work on the data for a user or users. The operating system provides an interface between the applications and the hardware. The operating system performs two primary functions. First, it allocates resources to the applications. The resources include hardware resources—such as processor time, memory space, and I/O devices—and software resources including some software resources that enable the hardware resources to perform tasks. Second, it controls execution of the applications to ensure proper operation of the computer.

Often, the software is conceptually divided into a user level, where the applications reside and which the users access, and a kernel level, where the operating system resides and which is accessed by system calls. Within an operating computer, a unit of work is referred to as a process. A process is computer code and data in execution. The process may be actually executing or it may be ready to execute or it may be waiting for an event to occur. System calls provide an interface between the processes and the operating system.

Checkpointing is a technique employed on some computers where an intermediate computational state of processes is captured. When processes take significant time to execute, they are susceptible to intervening system failures. By occasionally performing a checkpoint of processes and resources assigned to processes, the processes can be restarted at an intermediate computational state in an event of a system failure. Migration is a technique in which running processes are checkpointed and then restarted on another computer. Migration allows some processes on a heavily used computer to be moved to a lightly used computer. Checkpointing, restart, and migration have been implemented in a number of ways.

Operating system checkpoint, restart, and migration have been implemented as an integral part of several research operating systems. However, such research operating systems are undesirable because they lack an installed base and, consequently, few applications exist for them. Application level checkpoint, restart, and migration in conjunction with standard operating systems have also been implemented. But these techniques require that processes not use some common operating system services because the checkpointing only takes place at the application level.

Object based checkpoint, restart, and migration have also been implemented. Such object based approaches use particular programming languages or middleware toolkits. The object based approaches require that the applications be written in one of the particular programming languages or that the applications make explicit use of one of the middleware toolkits. A virtual machine monitor approach can be used to implement checkpoint, restart, and migration. But such an approach requires checkpointing and restarting all processes within the virtual machine monitor. This approach also exhibits poor performance due to isolation of the virtual machine monitor from an underlying operating system.

In *The Design and Implementation of Zap: A System for Migrating Computing Enviroments*, Proc. OSDI 2002, Osman et al. teach a technique of adding a loadable kernel module to a standard operating system to provide checkpoint, restart, and migration of processes for existing applications. The loadable kernel model divides the user level into process domains and provides virtualization of resources within each process domain. Such virtualization of resources includes virtual process identifiers and virtualized network addresses. Processes within one process domain are prevented from interacting with processes in another process domain using inter-process communication techniques. Instead, processes within different process domains interact using network communications and shared files set up for communication between different computers.

Checkpointing in the technique taught by Osman et al. records the processes in a process domain as well as the state of the resources used by the processes. Because resources in the process domain are virtualized, restart or migration of a process domain includes restoring resource identifications to a virtualized identity that the resources had at the most recent checkpoint.

While the checkpoint, restart, and migration techniques taught by Osman et al. show promise, several areas could be improved. In particular, these techniques are only capable of working with processes within a single process domain. There is no technique for checkpointing parallel processes executing within a plurality of process domains.

What is needed is a method of checkpointing parallel processes operating within a plurality of process domains.

SUMMARY OF THE INVENTION

The present invention comprises a method of checkpointing parallel processes in execution within a plurality of process domains. According to an embodiment, the method begins with a step of setting communication rules to stop communication between the process domains. Each process domain comprises an execution environment at a user level for at least one of the parallel processes. The method continues with a step of checkpointing each process domain and any in-transit messages. The method concludes with a step of resetting the communication rules to allow the communication between the process domains.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention comprises a method of checkpointing parallel processes in execution within a plurality of process domains. According to an embodiment, the process domains are distributed over a plurality of nodes which are coupled together by a network. Each node comprises a computer system. According to an embodiment, the method checkpoints the parallel processes and then continues execution. According to another embodiment, the method checkpoints the parallel process and then kills the parallel processes. According to this embodiment, the parallel processes are later restored. According to an embodiment, the parallel processes are restored on the nodes which originally hosted the parallel processes. According to another embodiment, restoration of the parallel processes includes migrating at least one of the parallel processes from a first node on which the parallel process was checkpointed to a second node.

Figure 1:
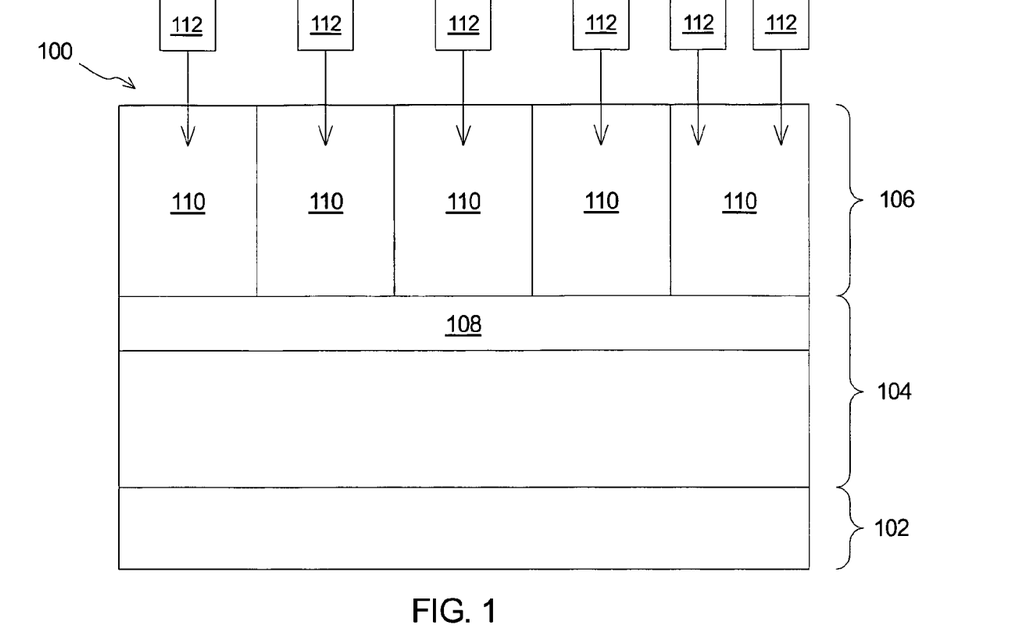
FIG. 1 schematically illustrates an embodiment of a computer system which implements at least a portion of a method of checkpointing parallel processes in execution within a plurality of process domains of the present invention.

An embodiment of a computer system which implements at least a portion of the method of the present invention is illustrated schematically in FIG. 1. The computer system 100 comprises computer hardware 102, an operating system kernel 104 (i.e., a kernel level), and a user level 106. The operating system kernel 104 includes a process domain module 108, which divides the user level 106 into a plurality of process domains 110. As users 112 access and leave the computer system 100, the process domain module 108 creates and terminates process domains 110 as needed. At a minimum, the process domain module 108 forms a single process domain 110 at the user level 106.

Figure 2:
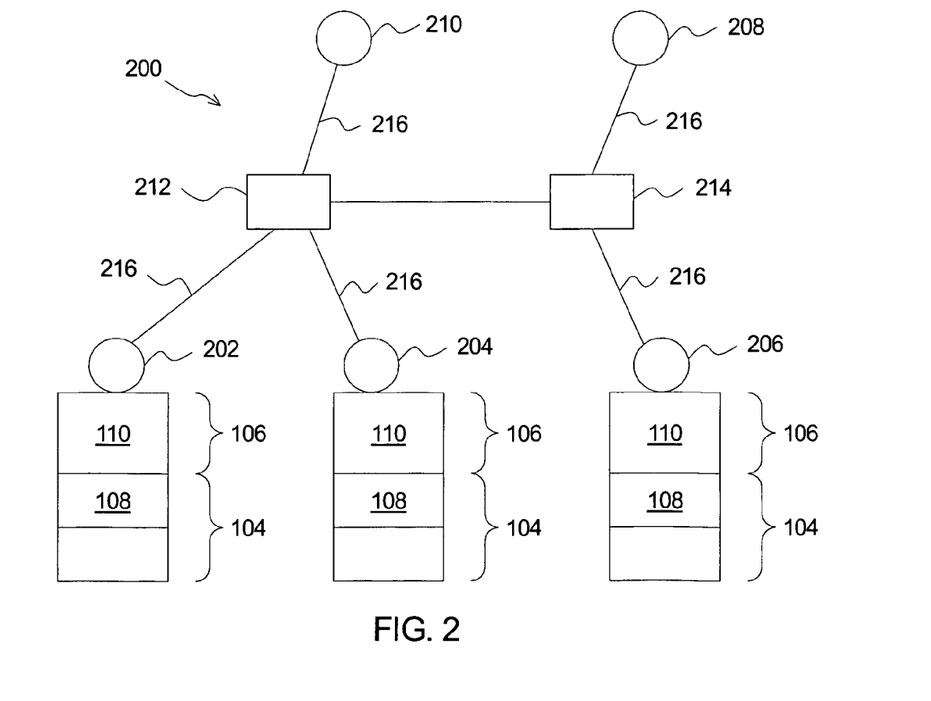
FIG. 2 schematically illustrates a cluster of computers which implements a method of checkpointing parallel processes in execution within a plurality of process domains of the present invention.

An embodiment of a cluster of computers which implements the method of the present invention is illustrated schematically in FIG. 2. The cluster of computers 200 comprises first through fifth nodes, 202 . . . 210 and first and second switches, 212 and 214, coupled together by network links 216. Each of the first through third nodes, 202 . . . 206, comprise the kernel level 104 and the user level 106. Each of the kernel levels 104 of the first through third nodes, 202 . . . 206, comprise the process domain module 108. Each of the user levels 106 of the first through third nodes, 202 . . . 206, comprise the process domain 110. Over a period of time, the first through third nodes, 202 . . . 206, execute a parallel application, which comprises first through third parallel processes. The first through third parallel processes execute within the process domains 110 of the first through third nodes, 202 . . . 206, respectively. Occasionally as the first through third parallel processes execute, one of the first through third parallel processes sends a message which is received by an another of the first through third parallel processes.

According to an embodiment of the method of checkpointing the parallel processes of the present invention, the first through third parallel processes are periodically checkpointed so that, in an event of failure of one or more of the first through third parallel processes, the first through third parallel processes can be restarted at an intermediate point rather than returning to a starting point.

According to another embodiment, the first through third parallel processes are checkpointed as part of a suspend operation. The suspend operation checkpoints the first through third parallel processes and then kills them. A need for the suspend operation may arise, for example, when a higher priority need for one or more of the first through third nodes, 202 . . . 206, arises. Later, the first through third parallel processes can be restored when the higher priority need no longer exists.

According to another embodiment of the method of checkpointing the parallel processes of the present invention, the first through third parallel processes are checkpointed so that one or more of the first through third parallel processes can be migrated to another node. Such a need may arise, for example, when one of the first through third nodes, 202 . . . 206, requires maintenance.

Figure 3:
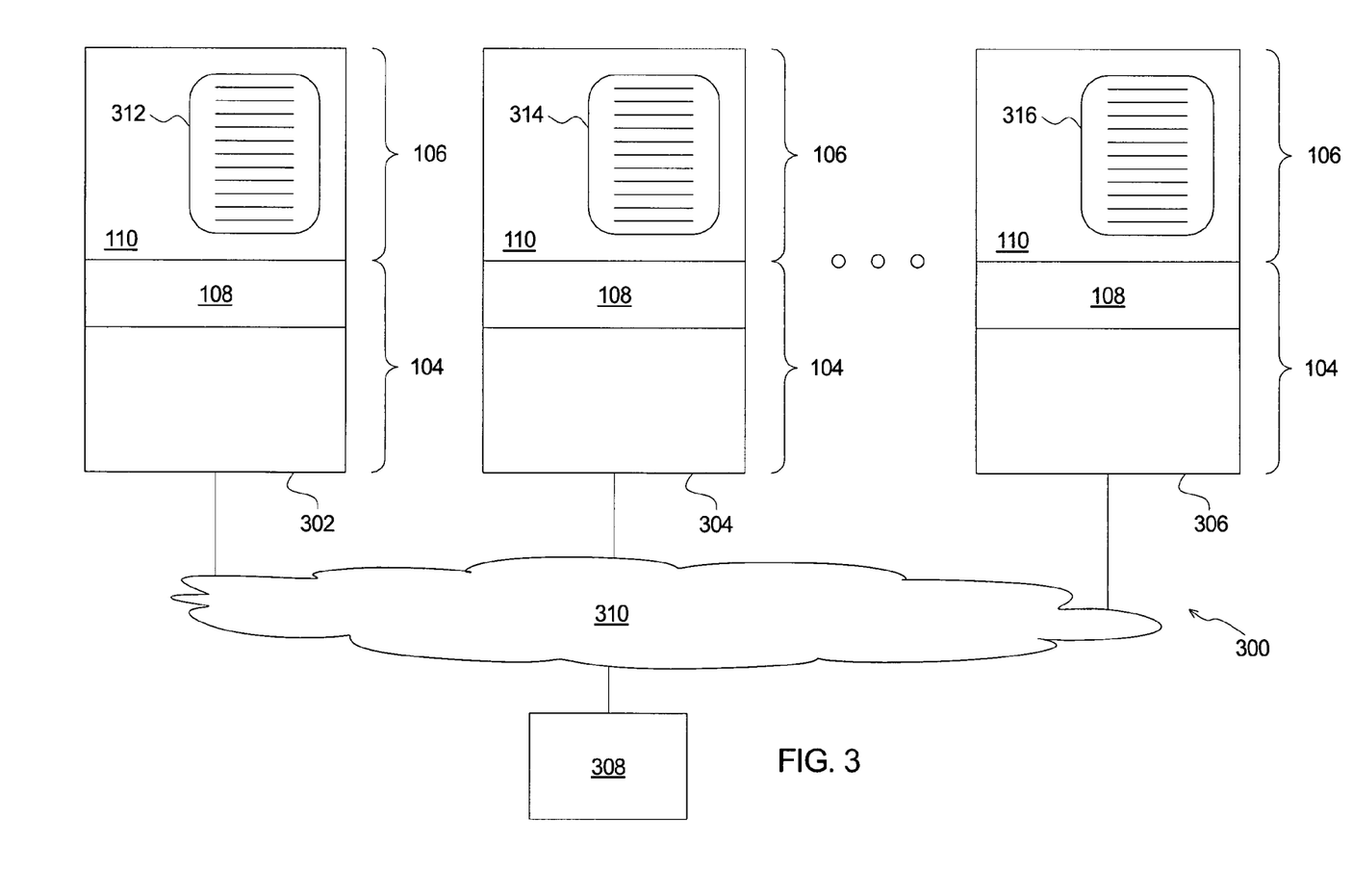
FIG. 3 schematically illustrates a computer network which implements a method of checkpointing parallel processes in execution within a plurality of process domains of the present invention.

An embodiment of a computer network which implements a method of checkpointing parallel processes of the present invention is illustrated schematically in FIG. 3. The computer network 300 comprises first through nth nodes, 302 . . . 306 and a coordinator 308 coupled together by a network 310. According to an embodiment, the coordinator 308 comprises a separate node. According to another embodiment, the coordinator 308 comprises one of the first through nth nodes, 302 . . . 306. Each of the first through nth nodes, 302 . . . 306, comprise the kernel level 104 and the user level 106. The kernel level 104 of each of the first through nth nodes, 302 . . . 306, includes the process domain module 108. The process domain module 108 of each of the first through nth nodes, 302 . . . 206, forms the process domain 110 at the user level 106 for each of the first through nth nodes, 302 . . . 306. First through nth parallel processes, 312 . . . 316, execute within the process domains 110 of the first through nth nodes, 302 . . . 306, respectively.

According to an embodiment, the computer network 300 comprises a cluster of computers in which the network 310 comprises a LAN (local area network). According to another embodiment, the computer network 300 comprises a more disperse group of computers in which the network 310 comprises a WAN (wide area network) such as the Internet.

Figure 4A:
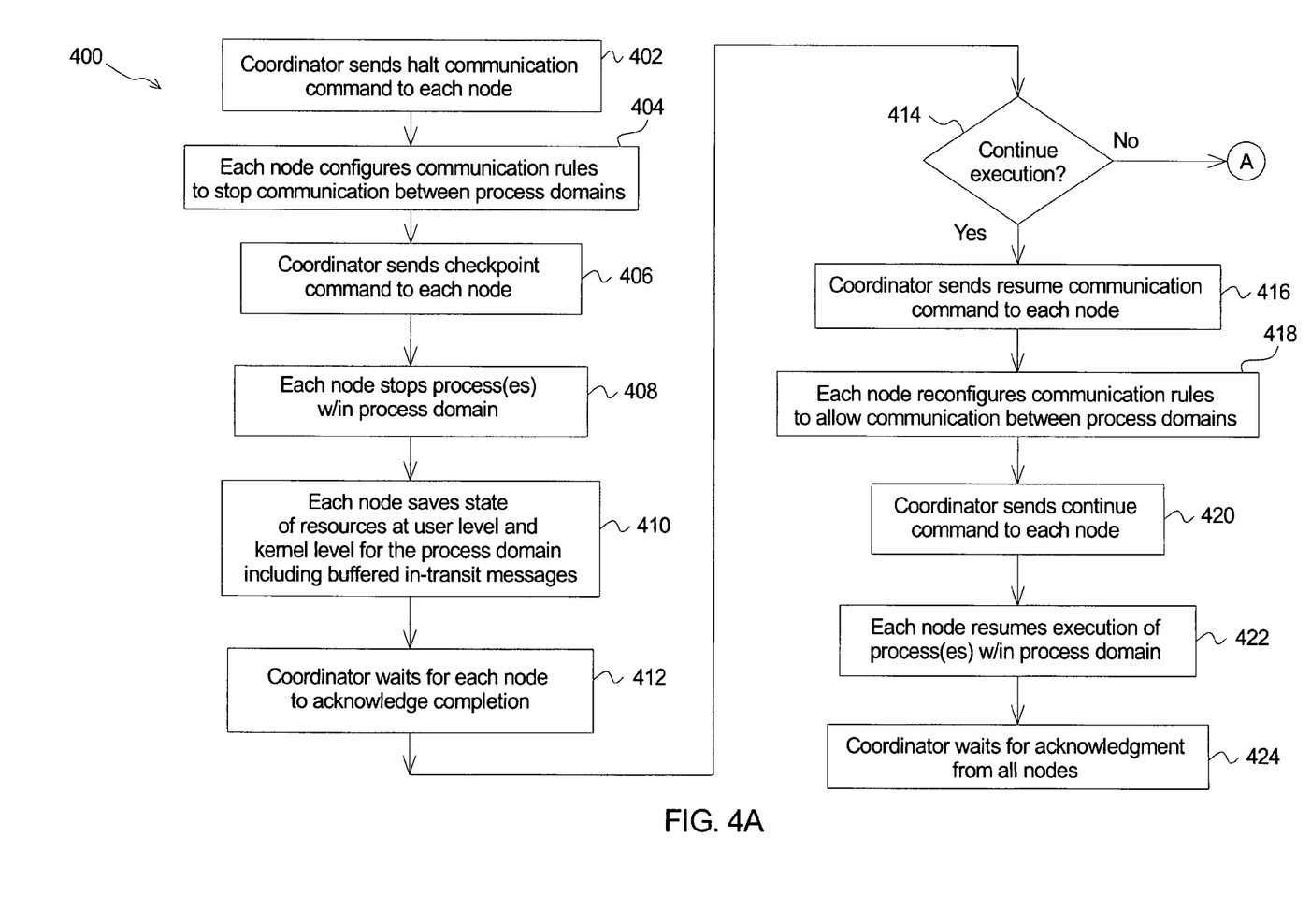
FIG. 4 illustrates a method employing a coordinator to checkpoint parallel processes in execution within a plurality of process domains of the present invention as a flow chart.
Figure 4B:
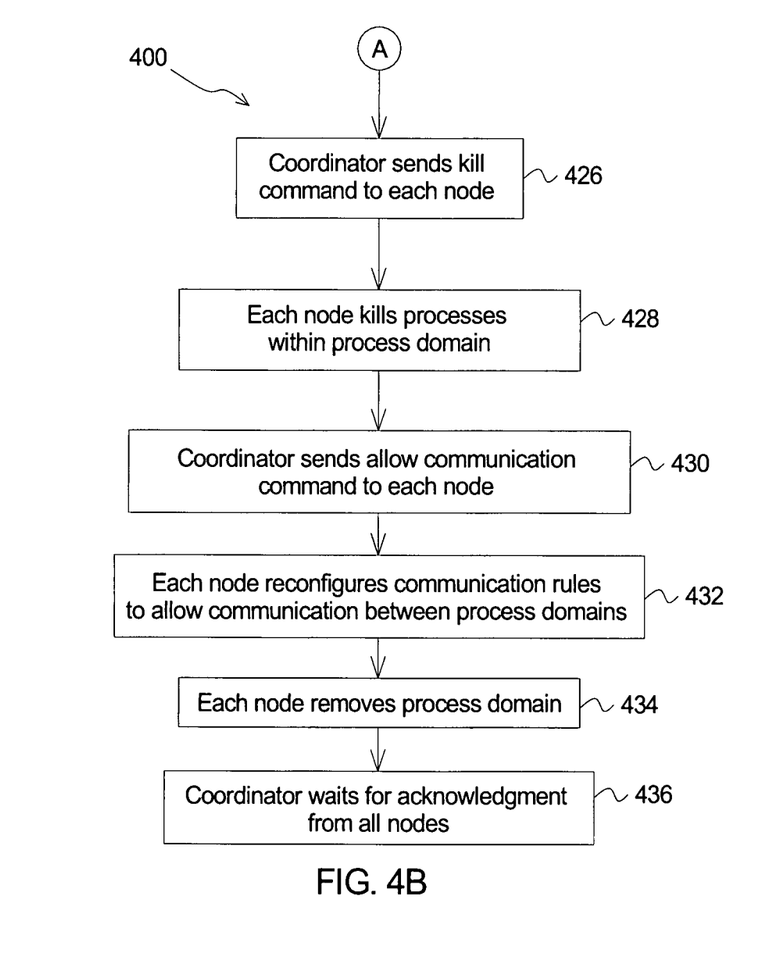

An embodiment of a method of checkpointing the first through nth parallel processes, 312 . . . 316, of the present invention is illustrated as a flow chart in FIGS. 4A and 4B. The method 400 begins with a first step 402 in which the coordinator 308 (FIG. 3) sends a halt communication command to each of the first through nth nodes, 302 . . . 306. In response, each of the first through nth nodes, 302 . . . 306, configures communication rules to stop communication between the process domains 110 in a second step 404.

According to an embodiment which employs the Linux operating system, the second step 404 makes use of netfilter( ) and iptables to configure communication rules. The iptables comprise the communication rules which the netfilter( ) uses to stop the communication between the process domains 110.

According to an embodiment, the communication rules for each of the first through nth nodes, 302 . . . 306, prevent the process domain 110 on the node from sending messages and from receiving messages. Each instantiation of configuring the communication rules on the first through nth nodes, 302 . . . 306, need not be synchronized with other instantiations on others of the first through nth nodes, 302 . . . 306. This means that the first node 302 could send a message to the second node 304 before the communications rules on the first node 302 have been configured but after the communication rules on the second node 304 have been configured. The communication rule on the second node 304 will prevent such a message from being received by the second node 304. In another case, a communication rule could be configured on the first node 302 to stop communication before a message was sent. Such messages comprise in-transit messages. In yet another case, a message could be sent by the first node 302 and received by the second node 304 before the communication rules have been configured for the first or second nodes, 302 or 304. In such a case, the message might not be retrieved by the process running on the second node 304 before the process running on the second node 304 is stopped in a later step. Such messages also comprise in-transit messages. According to an embodiment, each of the first through nth nodes, 302 . . . 306, buffer the any in-transit messages on the node or nodes which sent the in-transit messages.

According to an embodiment, the first through nth nodes, 302 . . . 306, employ TCP (Transmission Control Protocol) to send and receive messages. TCP retains a kernel level copy of each message sent by a sending node until the sending node receives a confirmation from a receiving node. TCP also retains a kernel level copy of each message received by a receiving node until the process running on the receiving node retrieves the message. According to this embodiment, the kernel level copies comprise the buffered in-transit messages.

It will be readily apparent to one skilled in the art that the buffering of in-transit messages on each of the first through nth nodes, 302 . . . 306, is different from network switch buffering. The network switch buffering places packets in one or more buffers (or queues) of network switches as messages move from one of the first through nth nodes, 302 . . . 306, through the network 310 to another of the first through nth nodes, 302 . . . 306. In contrast, the buffering of in-transit messages comprises a kernel level operation on each of the first through nth nodes, 302 . . . 306, which retains the messages in memory.

In a third step 406, the coordinator 308 sends a checkpoint command to each of the first through nth nodes, 302 . . . 306. In response, each of the first through nth nodes, 302 . . . 306, begins a checkpoint process. Each of the checkpoint processes on the first through nth nodes, 302 . . . 306, stops the first through nth parallel processes, 312 . . . 316, respectively, in a fourth step 408. In a fifth step 410, each of the checkpoint processes on the first through nth nodes, 302 . . . 306, saves a state of resources for the process domains 110 on the first through nth nodes, 302 . . . 306, respectively. The resources for which the state is saved includes kernel level resources and user level resources for the process domain 110 as well as the any in-transit messages which were buffered. The buffered in-transit messages on each node comprise messages that have not yet been successfully sent from the node, messages that have been sent from the node but for which no acknowledgement of successful receipt has been received from a receiving node, and messages that have been received successfully at the node but which have not yet been retrieved by the processes in the node. Preferably, each of the first through nth nodes, 302 . . . 306, saves the state of the resources in a stable repository such as in a file on a disk storage. Alternatively, one or more of the first through nth nodes, 302 . . . 306, save the state of the resources in a memory.

In a sixth step 412, the coordinator 308 waits for each of the first through nth nodes, 302 . . . 306, to acknowledge completion of the fourth step 408. In a seventh step 414, the coordinator 308 determines whether the checkpointing forms part of a checkpoint operation or whether the checkpointing forms part of a suspend operation. The checkpoint operation is discussed immediately below. The suspend operation is discussed following the discussion of the checkpoint operation.

If the checkpoint operation is being performed, in an eighth step 416, the coordinator 308 sends a resume communication command to each of the first through nth nodes, 302 . . . 306. In response, each of the first through nth nodes, 302 . . . 306, reconfigures the communication rules to allow communication between the process domains 110 in a ninth step 418. In an tenth step 420, the coordinator 308 sends a continue command to each of the first through nth nodes, 302 . . . 306. In an eleventh step 422, each of the first through nth nodes, 302 . . . 306, resumes execution of the first through nth parallel processes, 312 . . . 316. According to an embodiment, in a twelfth step 424, the coordinator 308 waits for an acknowledgment from the first through nth nodes, 302 . . . 306, indicating that the first through nth parallel processes, 312 . . . 316, have continued execution. According to another embodiment, the twelfth step 424 is not performed and instead the coordinator 308 verifies that the first through nth parallel processes, 312 . . . 316, have continued execution using another technique (e.g., listing state of processes on the nodes).

If the suspend operation is being performed, in a thirteenth step 426, the coordinator 308 sends a kill command to each of the first through nth nodes, 302 . . . 306. In a fourteenth step 428, each of the first through nth nodes, 302 . . . 306, kills the first through nth parallel processes, 312 . . . 316, respectively. In a fifteenth step 430, the coordinator 308 sends an allow communication command to each of the first through nth nodes, 302 . . . 306. In a sixteenth step 432, each of the first through nth nodes, 302 . . . 306, reconfigures the communication rules to allow communication between the process domains 110. In a seventeenth step 434, each of the first through nth nodes, 302 . . . 306, removes their respective process domain 110. According to an embodiment, in an eighteenth step 436, the coordinator 308 waits for an acknowledgment from the first through nth nodes, 302 . . . 306, indicating that the first through nth parallel processes, 312 . . . 316, have been killed. According to another embodiment, the eighteenth step 436 is not performed and instead the coordinator 308 verifies that the first through nth parallel processes, 312 . . . 316, have been killed using another technique. At some later time, a method of restarting the first through nth parallel processes, 312 . . . 316, is employed to resume execution of the first through nth parallel processes, 312 . . . 316.

Figure 5:
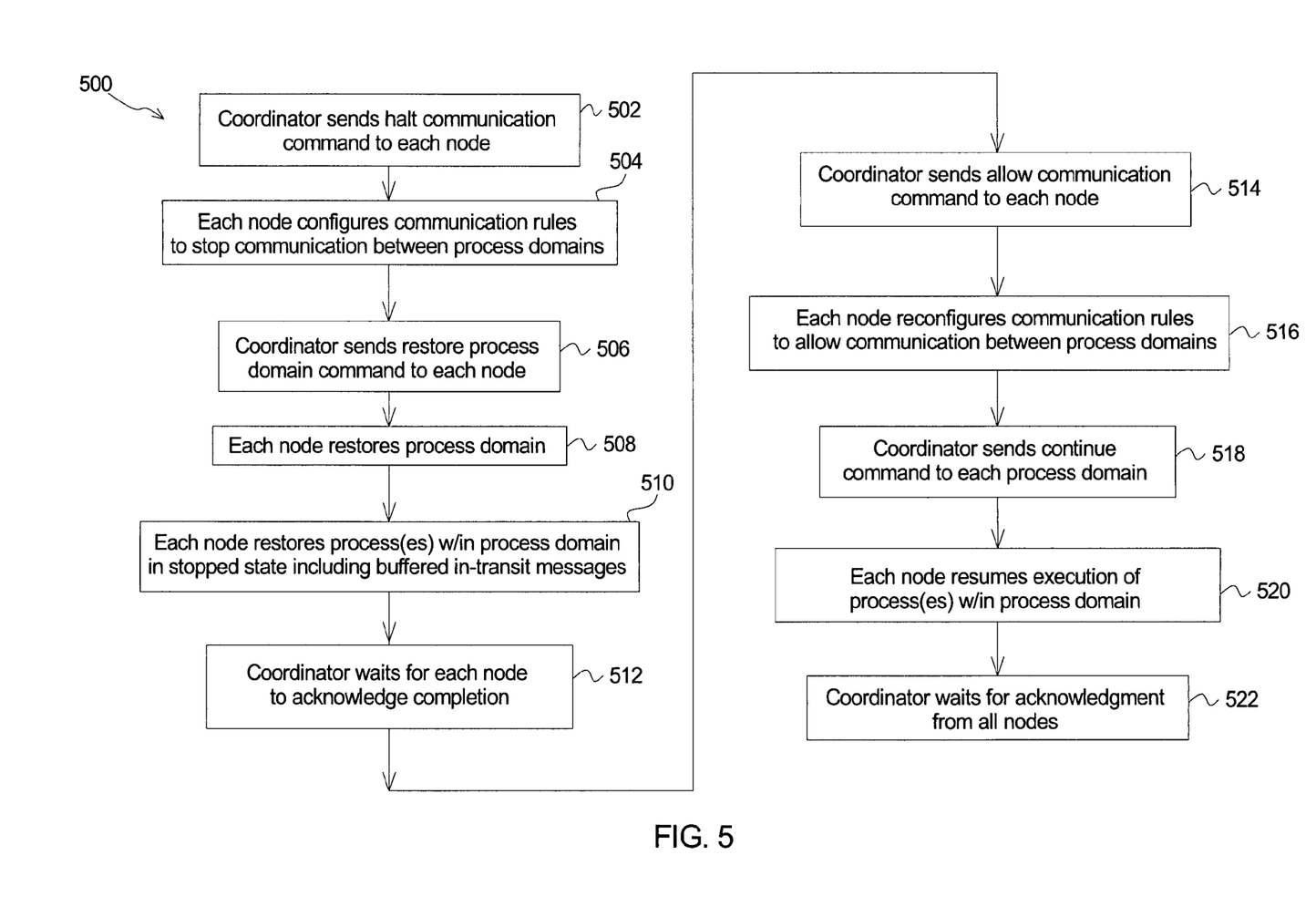
FIG. 5 illustrates a method employing a coordinator to restart parallel processes within a plurality of process domains of the present invention as a flow chart.

An embodiment of a method of restarting the first through nth parallel processes, 312 . . . 316, of the present invention is illustrated as a flow chart in FIG. 5. According to an embodiment of the method 500, the first through nth parallel processes, 312 . . . 316, are restarted on the first through nth nodes, 302 . . . 306, respectively. According to another embodiment of the method 500, one or more of the first through nth parallel processes, 312 . . . 316, are migrated to a new node or nodes. The method 500 begins in a first step 502 in which the coordinator 308 sends a halt communication command to each of the first through nth nodes, 302 . . . 306. In response, each of the first through nth nodes, 302 . . . 306, configures communication rules to stop communication between the process domains 110 in a second step 504.

In a third step 506, the coordinator 308 sends a restore process domain command to each of the first through nth nodes, 302 . . . 306. In a fourth step 508, each of the first through nth nodes, 302 . . . 306, restores the process domain 110 for its own node. In a fifth step 510, each of the first through nth nodes, 302 . . . 306, restores the first through nth processes, 312 . . . 316, in a stopped state, including any buffered in-transit messages which were previously saved. In a sixth step 512, the coordinator 308 waits for each of the first through nth nodes, 302 . . . 306, to acknowledge completion of restoration of the first through nth parallel processes, respectively. In a seventh step 514, the coordinator 308 sends an allow communication command to each of the first through nth nodes, 302 . . . 306. In response, each of the first through nth nodes, 302 . . . 306, reconfigures the communication rules for itself to allow communication between the process domains 110 in an eighth step 516.

The method 500 continues in a ninth step 518 in which the coordinator 308 sends a continue command to each of the first through nth nodes, 302 . . . 306. In an tenth step 520, each of the first through nth nodes, 302 . . . 306, resumes execution of the first through nth parallel processes, 312 . . . 316. According to an embodiment, in an eleventh step 522, the coordinator 308 waits for an acknowledgment from the first through nth nodes, 302 . . . 306, indicating that the first through nth parallel processes, 312 . . . 316, have resumed execution. According to another embodiment, the eleventh step 522 is not performed and instead the coordinator 308 verifies that the first through nth parallel processes, 312 . . . 316, have resumed execution using another technique.

Each of the method 400 (FIGS. 4A and 4B) and the method 500 (FIG. 5) employs the coordinator 308 (FIG. 3) to control execution of the method. Alternative embodiments of the methods do not employ the coordinator 308. Instead, the alternative embodiments employ a peer-to-peer mechanism in which one of the first through nth nodes, 302 . . . 306, directs the nodes to begin execution of the alternative methods. According to the alternative embodiments, the computer network 300 does not include the coordinator 308.

Figure 6A:
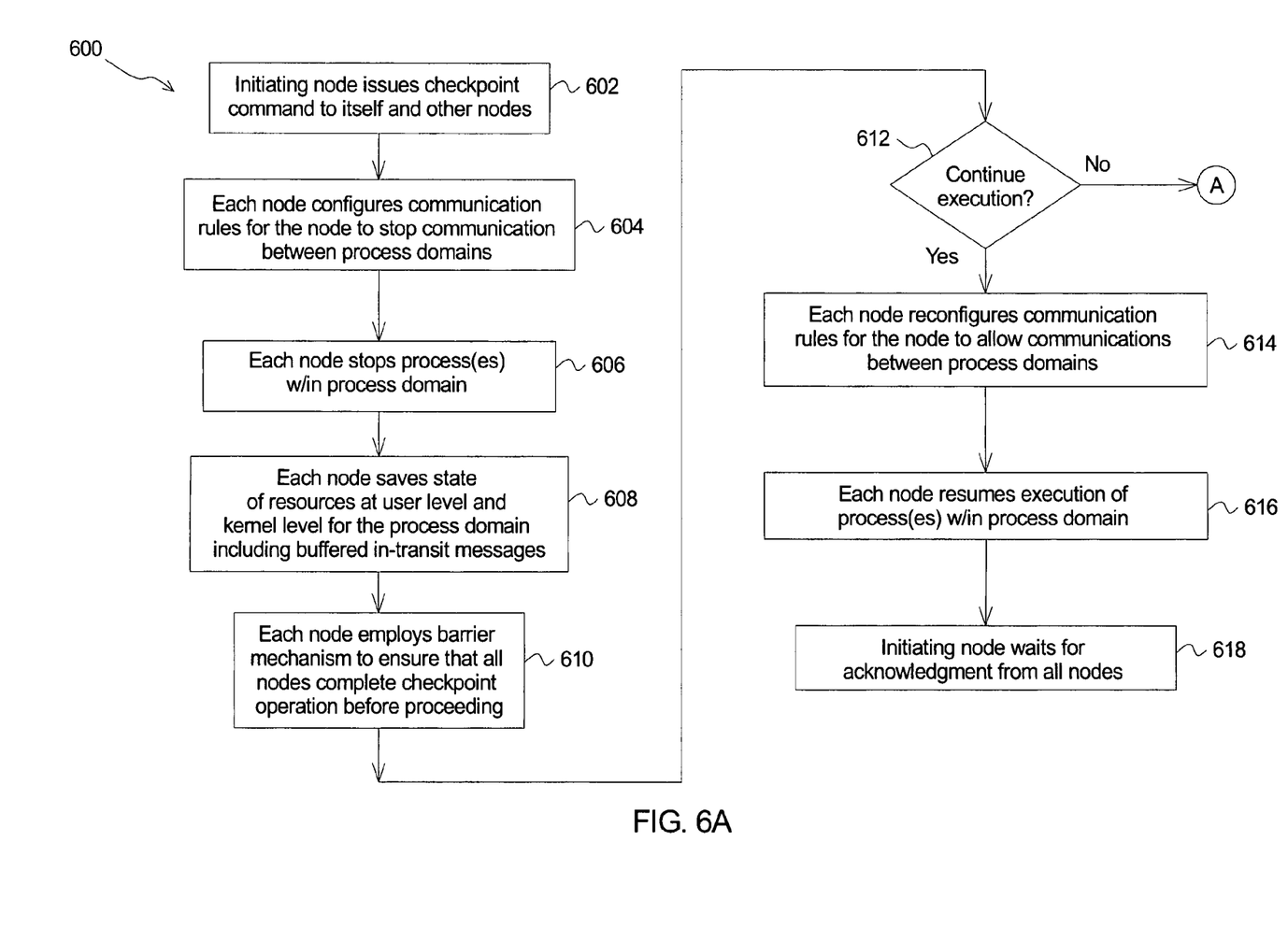
FIG. 6 illustrates a method employing a peer-to-peer mechanism to checkpoint parallel processes in execution within a plurality of process domains of the present invention as a flow chart.
Figure 6B:
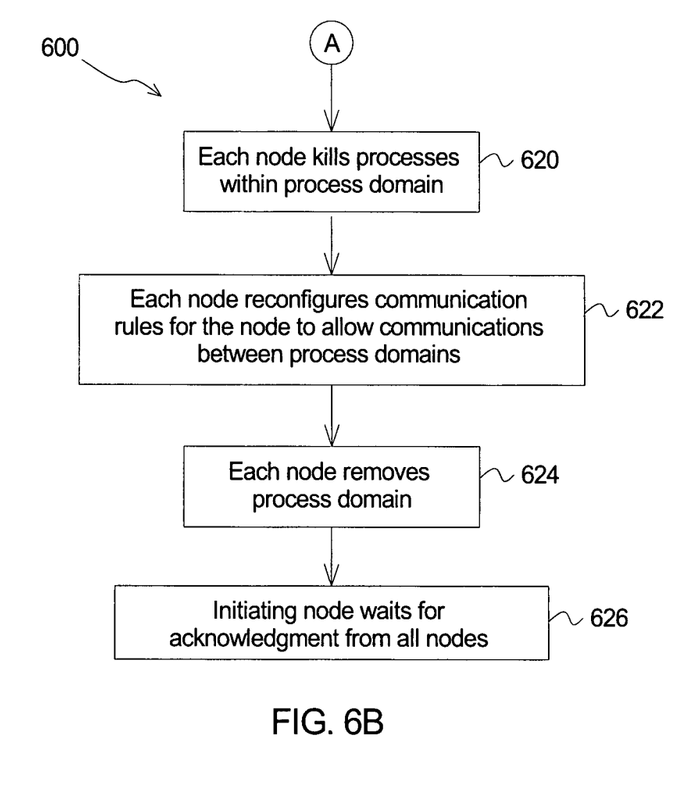

An alternative embodiment of a method of checkpointing the first through nth parallel processes, 312 . . . 316, of the present invention is illustrated as a flow chart in FIGS. 6A and 6B. According to an embodiment of the method 600, a particular node of the first through nth nodes, 302 . . . 306, initiates the checkpoint operation as part of a regular schedule of checkpoints. According to another embodiment, the particular node initiates the checkpoint operation in response to a user request. The method 600 begins with a first step 602 in which the particular node issues a checkpoint command to itself and others of the first through nth nodes, 302 . . . 306.

In a second step 604, each of the first through nth nodes, 302 . . . 306, configures communication rules for itself to stop communication between the process domains 110. In a third step 606, each of the first through nth nodes, 302 . . . 306, stops the first through nth processes, 312 . . . 316, respectively. In a fourth step 608, each of the first through nth nodes, 302 . . . 306, saves a state of resources for the process domains 110 on the first through nth nodes, 302 . . . 306, respectively. The resources for which the state is saved includes kernel level and user level resources for the process domain 110 as well as any in-transit messages. Preferably, each of the first through it nodes, 302 . . . 306, saves the state of the resources in a stable repository such as a file on a disk storage. Alternatively, one or more of the first through nth nodes, 302 . . . 306, save the state of the resources in a memory.

The method 600 continues in a fifth step 610 in which each of the first through nth nodes, 302 . . . 306, employs a barrier mechanism to ensure that all of the first through nth nodes, 302 . . . 306, complete the fourth step 608 before any of the first through nth nodes, 302 . . . 306, proceed. The barrier mechanism comprises a built-in system operation for synchronizing processes. In a sixth step 612, a particular node determines whether the checkpointing forms part of a checkpoint operation or whether the checkpointing forms part of a suspend operation. The checkpoint operation is discussed immediately below. The suspend operation is discussed following the discussion of the checkpoint operation.

If the checkpoint operation is being performed, in a seventh step 614, each of the first through nth nodes, 302 . . . 306, reconfigures the communication rules for itself to allow communication between the process domains 110. In an eighth step 616, each of the first through nth nodes resumes execution of the first through nth parallel processes, 312 . . . 316, respectively. According to an embodiment, in a ninth step 618, the particular node waits for an acknowledgment from the first through nth nodes, 302 . . . 306, indicating that the first through nth parallel processes, 312 . . . 316, have continued execution. According to another embodiment, the ninth step 618 is not performed and instead the particular node verifies that the first through nth parallel processes, 312 . . . 316, have continued execution using another technique.

If the suspend operation is being performed, in a tenth step 620, each of the first through nth nodes, 302 . . . 306, kills the first through nth parallel processes, 312 . . . 316. In an eleventh step 622, each of the first through nth nodes reconfigures the communication rules to allow the communication between the process domains 110. In a twelfth step 624, each of the first through nth nodes, 302 . . . 306, removes their respective process domains 110. According to an embodiment, in a thirteenth step 626, the particular node waits for an acknowledgment from the first through nth nodes, 302 . . . 306, indicating that the first through nth parallel processes, 312 . . . 316, have been killed. According to another embodiment, the thirteenth step 626 is not performed and instead the particular node verifies that the first through nth parallel processes, 312 . . . 316, have been killed using another technique.

Figure 7:
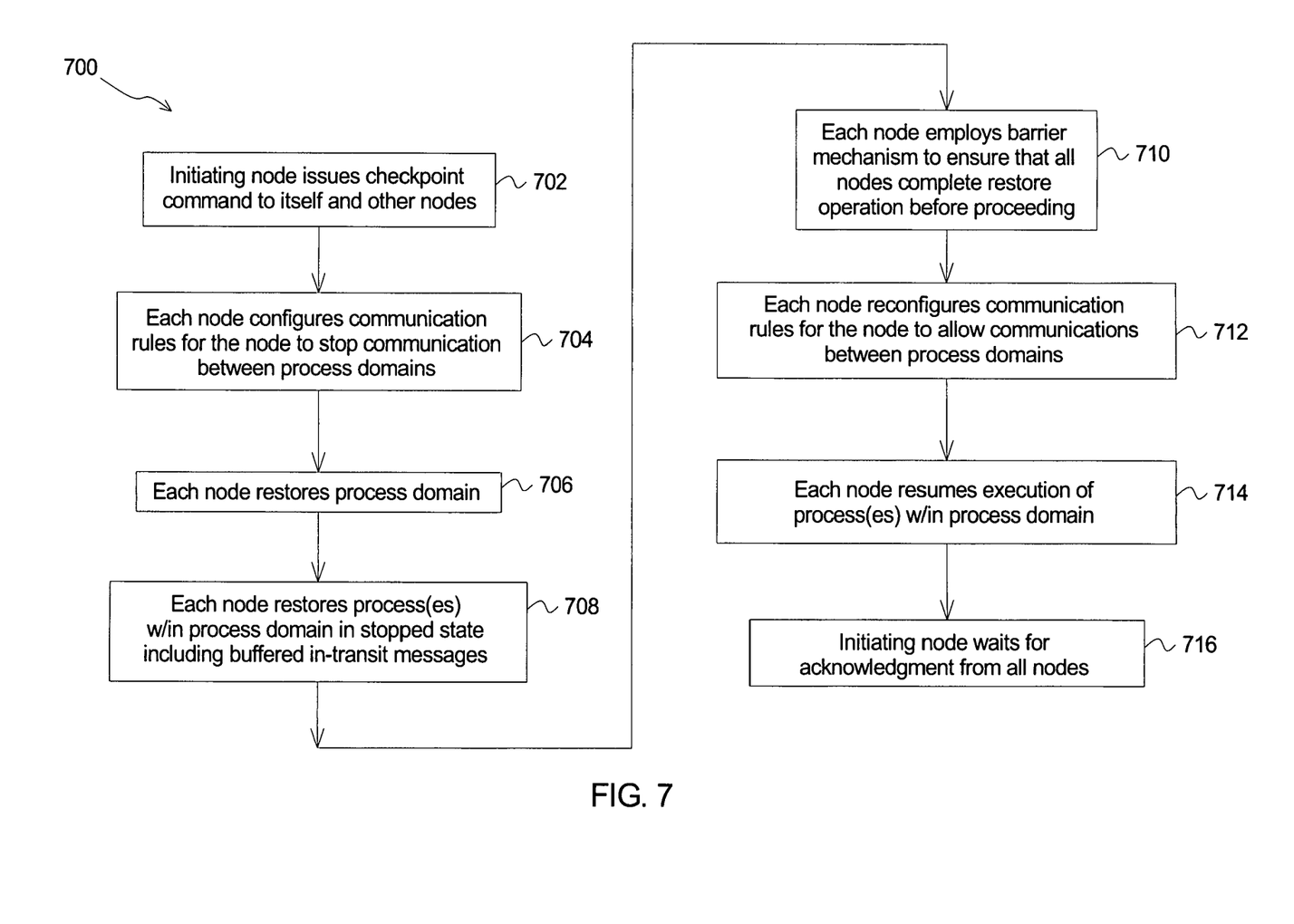
FIG. 7 illustrates a method employing a peer-to-peer mechanism to restart parallel processes within a plurality of process domains of the present invention as a flow chart.

An alternative embodiment of a method of restarting the first through nth parallel processes, 312 . . . 316, of the present invention is illustrated as a flow chart in FIG. 7. According to an embodiment of the method 700, the first through nth parallel processes, 312 . . . 316, are restarted on the first through nth nodes, 302 . . . 306, respectively. According to another embodiment of the method 700, one or more of the first through nth parallel processes, 332 . . . 336, are migrated to a new node or nodes. The method 700 begins in a first step 702 in which a particular node sends a restart command to itself and others of the first through nth nodes, 302 . . . 306.

In a second step 704, each of the first through nth nodes, 302 . . . 306, configures communication rules for itself to stop communication between the process domains 110. In a third step 706, each of the first through nth nodes, 302 . . . 306, restores the process domain 110 for its own node. In a fourth step 708, each of the first through nth nodes, 302 . . . 306, restores the first through nth processes, 312 . . . 316, in a stopped state, including any buffered in-transmit messages which were previously saved. In a fifth step 710, each of the first through nth nodes, 302 . . . 306, employs a barrier mechanism to ensure that all of the first through nth nodes, 302 . . . 306, complete the fourth step 708 before any of the first through nth nodes, 302 . . . 306, proceed.

In a sixth step 712, each of the first through nth nodes reconfigures the communication rules for itself to allow communication between the process domains 110. In a seventh step 714, each of the first through nth nodes resumes execution of the first through nth parallel processes, 312 . . . 316, respectively. According to an embodiment, in an eighth step 716, the particular node waits for an acknowledgment from the first through nth nodes, 302 . . . 306, indicating that the first through nth parallel processes, 312 . . . 316, have resumed execution. According to another embodiment, the eighth step 716 is not performed and instead the particular node verifies that the first through nth parallel processes, 312 . . . 316, have resumed execution using another technique.

It will be readily apparent to one skilled in the art that while the methods discussed herein refer to a parallel process within a process domain any process domain could have multiple parallel processes. In such a situation, the steps of the methods which discuss operations on a parallel process within a process domain will be understood by one skilled in the art to refer to operations on the multiple parallel processes.

It will be readily apparent to one skilled in the art that various modifications can be made to the methods of the present invention. Such modifications include separating steps into multiple steps, combining steps into a single command, or rearranging an order of steps. Examples include the following: A checkpoint command of the present invention can be divided into a stop command and a save state command. A suspend operation of the present invention can be implemented using a single suspend command which combines checkpoint and kill commands. A restart method of the present invention can implement steps of sending a resume communication command and sending a continue command in either order. Or, a process domain can include an independent process other than one of the parallel processes in which case the independent process can be allowed to proceed without interruption by the methods of the present invention.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of checkpointing parallel processes in execution within a plurality of process domains comprising the steps of:
   setting communication rules to stop communication between process domains, the process domains being hosted by a plurality of nodes, each node comprising a user level and a kernel level and each process domain comprising an execution environment at the user level for at least one of the parallel processes;
   checkpointing each process domain and any in-transit messages, the step of checkpointing each process domain comprising saving a state of resources at the user level and the kernel level for the process domain; and
   resetting the communication rules to allow the communication between the process domains.

2. The method of claim 1 wherein the kernel level of each node comprises a loadable kernel module which virtualizes resources within the process domain on the node.

3. The method of claim 1 wherein the state of resources is saved in a non-volatile storage.

4. The method of claim 1 wherein the state of at least some of the resources is saved in memory on one or more nodes.

5. The method of claim 1 wherein the state of resources saved comprises an incremental change to the state of the resources since the resources were last checkpointed.

6. The method of claim 1 wherein the step of checkpointing each process domain further comprises saving the any in-transit messages in the process domain.

7. The method of claim 6 wherein the step of checkpointing each process domain further comprises stopping the parallel process in execution within the process domain prior to saving the state of the resources.

8. The method of claim 7 further comprising the step of continuing execution of the parallel processes after the step of checkpointing each process domain.

9. The method of claim 8 further comprising the step of restoring the process domains and the parallel processes in the process domains if a failure occurs after the step of checkpointing each process domain.

10. The method of claim 7 further comprising the step of killing the parallel processes and removing the process domains after the step of checkpointing each process domain.

11. The method of claim 10 further comprising the step of restoring the process domains and the parallel processes within the process domains.

12. The method of claim 11 wherein the step of restoring the process domains and the parallel processes within the process domains comprises:
   restoring the process domains;
   setting the communication rules between the process domains to stop communication between the process domains;
   restoring the state of the parallel processes with the process domains and the any in-transit messages;
   resetting the communication rules between the process domains to allow the communication between the process domains; and
   continuing execution of the parallel processes.

13. The method of claim 11 further comprising the step of migrating at least one of the process domains from a first node to a second node.

14. A method of checkpointing parallel processes in execution within a plurality of process domains comprising the steps of:
   setting communication rules to stop communication between process domains hosted on nodes, each node comprising at least one of the process domains, a user level, and a kernel level, each process domain comprising at least a portion of the user level, each process domain providing an execution environment for at least one of the parallel processes, the kernel level of each node comprising a loadable kernel module which virtualizes resources within the at least one of the process domains on the node;
   checkpointing each process domain and any in-transit messages; and
   resetting the communication rules to allow the communication between the process domains.

15. The method of claim 14 wherein each node performs the steps of setting the communication rules, checkpointing the process domain, and resetting the communication rules.

16. The method of claim 15 wherein a coordinator controls the steps of setting the communication rules, checkpointing each process domain, and resetting the communication rules.

17. The method of claim 15 wherein the nodes employ a peer-to-peer system in which a particular node directs the nodes to begin the steps of setting the communication rules, checkpointing each process domain, and resetting the communication rules.

18. The method of claim 7 wherein each of the nodes employs a barrier mechanism to ensure that each node completes the step of checkpointing the process domain on the node before proceeding to the step of resetting the communication rules.

19. The method of claim 14 wherein the step of checkpointing each process domain comprises saving a state of resources at a user level and a kernel level for the process domain.

20. The method of claim 14 wherein the communication rules to stop the communication between the process domains comprise preventing the process domains from sending messages and preventing the process domains from receiving the messages.

21. A computer readable medium comprising computer code for implementing a method of checkpointing parallel processes in execution within a plurality of process domains, the method of checkpointing the parallel processes comprising the steps of:

setting communication rules to stop communication between process domains, the process domains being hosted by a plurality of nodes, each node comprising a user level and a kernel level and each process domain comprising an execution environment at the user level for at least one of the parallel processes;

checkpointing each process domain and any in-transit messages, the step of checkpointing each process domain comprising saving a state of resources at the user level and the kernel level for the process domain; and resetting the communication rules to allow the communication between the process domains.

22. A computer readable medium comprising computer code for implementing a method of checkpointing parallel processes in execution within a plurality of process domains, the method of checkpointing the parallel processes comprising the steps of:

setting communication rules to stop communication between process domains hosted on nodes, each node comprising at least one of the process domains, a user level, and a kernel level, each process domain comprising at least a portion of the user level, each process domain providing an execution environment for at least one of the parallel processes, the kernel level of each node comprising a loadable kernel module which virtualizes resources within the at least one of the process domains on the node;

checkpointing each process domain and any in-transit messages; and resetting the communication rules to allow the communication between the process domains.

* * * * *